July 23, 1963   A. R. FORSBERG   3,098,515
SEED HULLING AND SEPARATING MACHINE
Filed Jan. 23, 1961

INVENTOR.
*ARTHUR R. FORSBERG*
BY
*Williamson & Palmatier*
ATTORNEYS

United States Patent Office 3,098,515
Patented July 23, 1963

3,098,515
SEED HULLING AND SEPARATING MACHINE
Arthur R. Forsberg, Thief River Falls, Minn.
Filed Jan. 23, 1961, Ser. No. 84,074
2 Claims. (Cl. 146—253)

This invention relates to grain and seed processing machinery and more particularly relates to a machine for removing seeds from their hulls and then separating the hulls and seeds from each other.

An object of my invention is the provision of a new and improved seed hulling and separating machine of simple and inexpensive construction and operation.

Another object of my invention is the provision of a seed hulling and separating machine which requires not additional handling or processing of the seed in order to completely separate the seeds from the hulls.

A further object of my invention is the provision of a seed hulling and separating machine which is particularly well adapted to the hulling of grains of the type having elongate kernels.

These and other objects and advantages of my invention will more fully appear from the following description made in connection with the accompanying drawings wherein like reference characters refer to the same or similar parts throughout the several views and in which.

Figure 2:
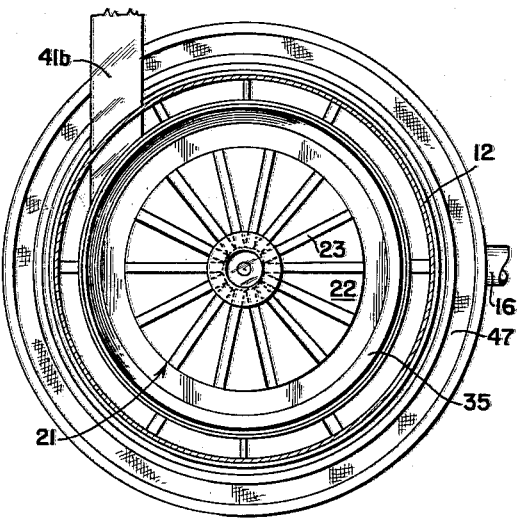
FIG. 2 is a section view taken on a plane as indicated at 2—2 in FIG. 1.
Figure 1:
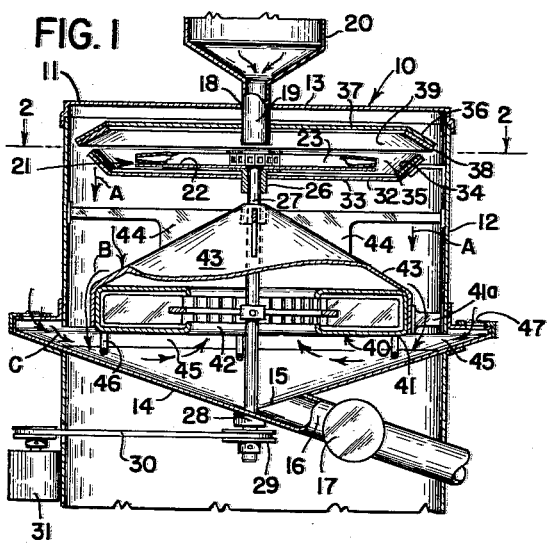
FIG. 1 is a vertical section view of the machine.

One form of the present invention is shown in the drawings and is described herein. The machine 10 includes a housing 11 having a cylindrical sidewall 12, a top wall 13 and a generally downwardly convergent cone-shaped bottom wall 14 having an opening 15 therein connected with a conduit 16 having an air lock 17 therein for discharging said kernels downwardly and preventing inward movement of air through the conduit. The top wall 13 has an opening 18 therein through which a seed supply conduit 19 extends and delivers seeds into the interior of the housing from a supply of seeds such as hopper 20.

Means are provided adjacent the housing top wall for removing the seed kernels from their hulls, and such means includes a rotor indicated in general by numeral 21 having a flat horizontally oriented base plate 22 with a plurality of elongate radially extending seed-guiding tubes 23 having tapered outer ends 24. The inner ends 25 of the several tubes 23 are disposed in side-by-side relation around the central portion of the plate 22 for effectively defining a seed-receiving receptacle portion at the center of the rotor. The tubes 23 are affixed as by welding to the plate 22. The plate 22 is affixed by bushing 26 to a vertical shaft 27 which extends downwardly through the apex of the bottom wall 14 and is mounted in a bearing 28 and has a drive pulley 29 affixed on the lower end thereof which is driven by belt 30 from motor 31 at high speeds.

An annular seed-deflecting and hull-removing ring 32 is disposed outwardly of the rotor 21 and is affixed as by brackets 32a to the housing sidewall 12. The ring 32 has a rigid backing 33 and a facing portion 34 defining a substantially conical, or frustro-conical inner surface 35 which obliquely faces the outer ends of tubular guides 23 and also obliquely faces in an upward direction. The facing material 34 may be constructed of any of a number of materials, but in any event the surface 35 is at least slightly roughened so as to produce a retarding effect on the seed hulls as the seeds engage the ring and the result will be that the seed kernels crack through the hulls to be removed therefrom. In the case of certain grains the facing material in ring 34 may be hard rubber and in other cases the facing ring 34 will be constructed of steel or other hard material.

A second annular seed and kernel deflecting ring 36 is somewhat larger in diameter than ring 32 and has a rigid backing 37 affixed by brackets 37a to the housing sidewall and carrying a facing ring 38 having a substantially conical or frustro-conical inner surface 39 disposed slightly outwardly and upwardly from the surface 35 of ring 32, and the surface 39 obliquely faces the surface 35 and also obliquely faces downwardly. The material in facing ring 38 may be substantially the same or slightly different in consistency to cause the surface 39 to retard seeds engaging the surface and permit the seed kernels to crack through the hulls.

The machine 10 is also provided with a fan indicated in general by numeral 40 having a circular casing 41 which is supported on brackets 41a in inwardly spaced relation with the housing sidewall 12. The fan has an inlet opening 42 facing downwardly and spaced from the the bottom wall 14. The fan 40 also has an air discharge 41b which extends tangentially and outwardly through the housing sidewall 12.

A cone-shaped deflector plate 43 engages the outer periphery of the fan casing and directs seeds and hulls falling thereon outwardly and downwardly toward the space between the fan casing and the sidewall. The plate 43 is supported on the housing by any suitable means such as spider 44.

The housing sidewall has a peripheral opening or openings 45 positioned below the fan casing and above the bottom wall 14 and a plurality of bracing members 46 extending across the opening. A screen 47 may be supported by suitable bracket means exterior of the opening.

In operation, the fan and rotor 21 are revolved at high speed by the motor 31. Seeds of wheat, oats or the like are supplied through the tube 19 onto the central portion of the rotor and the elongated seeds are immediately impelled radially outwardly through the guides 23 and as they are impelled outwardly these elongated seeds are oriented in a radial position. The rapidly moving seeds engage the surface 35 and because the hulls are slightly retarded the seeds will crack through the hulls and be removed therefrom. The kernels and seeds will then be deflected against the surface 39 of ring 36 and any seeds still having their hulls thereon will have their hulls removed by the impact against the ring 36. The seeds and hulls will move outwardly between the rings 32 and 36 and will fall freely in the direction of arrows A. Any seeds that fall downwardly against the cone-shaped plate 43 are deflected downwardly and the seeds and hulls ultimately fall in a substantially annularly shaped curtain as indicated by the arrows B. Air moving inwardly as indicated by the arrows C through the openings 45 moves through the curtain of falling seeds and hulls and sweeps the hulls along therewith into the inlet of the fan. The heavier seeds which are virtually unaffected by the inwardly sweeping air fall to the bottom wall 14 and move downwardly along the incline to the seed outlet. The air and hulls are discharged through the fan outlet 41b.

It will, of course, be understood that various changes may be made in the form, detail, arrangement and proportion of the parts without departing from the scope of my invention which consists of the matter described herein and set forth in the appended claims.

What I claim is:

1. Apparatus for removing the seed kernels from their hulls and separating the kernels and hulls, comprising an upright housing having a sidewall and a top wall with a seed inlet therein and an inclined bottom wall, a kernel outlet at the lowest portion of said bottom wall and including an air lock preventing inward movement of air and permitting outward movement of kernels, a rotor on a vertical axis beneath said seed inlet, said rotor having centrally seed-receiving means and having substantially radial seed guides directing the seeds radially therefrom as the rotor is revolved at high speed, a first annular ring having an inner substantially cone-shaped surface obliquely confronting the outer ends of the guides to engage and deflect the radially impelled seeds, said cone-shaped surface of said annular ring also obliquely facing a first endwise direction and being disposed inwardly from said housing sidewall, a second ring having an inner substantially cone-shaped surface disposed outwardly of said first annular ring and obliquely facing a second endwise direction and obliquely facing the cone-shaped surface of said first annular ring to be engaged by the seeds and kernels deflected from the first annular ring, said rings causing the hulls to be slightly retarded and to permit the kernels to break through and separate from the hulls, means revolving the rotor at high speeds, a fan in the housing below said rotor and having a casing spaced inwardly from said sidewall and having an air intake opening facing downwardly in spaced and confronting relation with said bottom wall and said fan also having a discharge extending to the exterior of the housing, said housing having air inlet openings in said sidewall below said fan and above said bottom whereby the air moves through the falling hulls and kernels and sweeps the hulls into the fan and to the discharge.

2. Apparatus for removing seed kernels from the hulls and then separating the kernels from the hulls, comprising an upright housing having a cylindrical sidewall and a top wall with a seed inlet therein and also having a downwardly inclined conical bottom wall, a seed kernel outlet at the lowest portion of said bottom wall and including an air lock preventing inward movement of air and permitting outward movement of seed kernels, a seed-receiving rotor on a vertical axis beneath said inlet and having a seed-receiving central portion and a plurality of elongate and generally tubular guides extending radially for orienting elongated seeds in a radial position and for impelling the seeds at high velocity radially of the rotor, means revolving the rotor at high speeds, a first annular ring outwardly of said rotor and spaced inwardly from said sidewall and having an inner substantially cone-shaped surface obliquely facing the outer ends of the guides and obliquely facing upwardly for engaging and deflecting radially impelled seeds and retarding the hulls to permit the seed kernels to crack therethrough, a second annular ring spaced outwardly and upwardly from said first ring and having an inner substantially conical surface obliquely facing said surface of the first ring and obliquely facing downwardly to be engaged by the radially impelled seeds and kernels deflected from the first ring for additionally retarding seed hulls and permitting the seed kernels to crack therethrough, a fan in the housing and having a circular casing with the periphery spaced inwardly from the sidewall and having an air intake opening facing downwardly in spaced and confronting relation with said bottom wall, said fan also having a discharge extending to the exterior of the housing, and said housing having air inlet openings in the sidewall below the fan and above the bottom wall whereby the air moves through the free-falling curtain of seeds and hulls adjacent the sidewall and sweeps the hulls into the fan and to the discharge.

References Cited in the file of this patent
UNITED STATES PATENTS

| | | |
|---|---|---|
| 1,617,187 | Volz | Feb. 8, 1927 |
| 2,378,393 | Carter | June 19, 1945 |

FOREIGN PATENTS

| | | |
|---|---|---|
| 666,572 | Great Britain | Feb. 13, 1952 |

OTHER REFERENCES

Ser. No. 355,597, Nyiri (A.P.C.), published May 4, 1953.